(12) United States Patent
Yen

(10) Patent No.: US 7,188,853 B2
(45) Date of Patent: Mar. 13, 2007

(54) TRICYCLE

(76) Inventor: Kuo-Cheng Yen, No. 9, Lane 847, Sec. 1, Jhongci Rd., Wuci Township, Taichung County (TW) 435

( * ) Notice: Subject to any disclaimer, the term of this patent is extended or adjusted under 35 U.S.C. 154(b) by 0 days.

(21) Appl. No.: 11/067,684

(22) Filed: Mar. 1, 2005

(65) Prior Publication Data

US 2006/0145447 A1    Jul. 6, 2006

(30) Foreign Application Priority Data

Jan. 4, 2005    (TW) .............................. 94100195 A

(51) Int. Cl.
*B62K 1/00* (2006.01)

(52) U.S. Cl. ................. 280/288.1; 280/281.1; 280/282

(58) Field of Classification Search ........... 280/282, 280/288, 262, 263, 266, 288.1, 278, 242.1, 280/62; D12/112

See application file for complete search history.

(56) References Cited

U.S. PATENT DOCUMENTS

| | | | | |
|---|---|---|---|---|
| 4,432,561 A | * | 2/1984 | Feikema et al. ............ 280/282 |
| 4,497,502 A | * | 2/1985 | Forbes et al. ............... 280/282 |
| 4,789,173 A | * | 12/1988 | Lofgren et al. ........... 280/288.1 |
| 5,145,196 A | * | 9/1992 | Langkamp ................... 280/278 |
| 5,263,732 A | * | 11/1993 | Harmeyer ................ 280/288.1 |
| 5,536,029 A | * | 7/1996 | Gramckow .................. 280/263 |
| 5,544,906 A | * | 8/1996 | Clapper ................... 280/288.1 |
| 5,568,935 A | * | 10/1996 | Mason ....................... 280/282 |
| 5,853,184 A | * | 12/1998 | Lofgren et al. .......... 280/242.1 |
| 6,062,581 A | * | 5/2000 | Stites .......................... 280/263 |
| 6,402,174 B1 | * | 6/2002 | Maurer ....................... 280/267 |
| D460,027 S | * | 7/2002 | Shafer et al. .............. D12/112 |
| 6,659,488 B1 | * | 12/2003 | Beresnitzky et al. ......... 280/282 |
| D485,514 S | * | 1/2004 | Berg ......................... D12/112 |
| 6,953,203 B2 | * | 10/2005 | Wilcox et al. .............. 280/282 |
| 6,988,741 B2 | * | 1/2006 | Borochov et al. .......... 280/282 |

FOREIGN PATENT DOCUMENTS

DE        19609628 A1 *    9/1997

* cited by examiner

*Primary Examiner*—Hau Phan
(74) *Attorney, Agent, or Firm*—Bacon & Thomas PLLC

(57) ABSTRACT

A tricycle is comprised of a frame, a front wheel, a parallel four-bar linkage, two rear wheels, and two handlebars. The frame includes a stationary fork connected with the front wheel. The linkage is mounted at a rear section of the frame, having two side bars. The two rear wheels are rotatably mounted respectively to the two side bars. The two handlebars are fixed to the linkage and located beside bilateral sides of the seat cushion. The user can let the hands control the two handlebars to drive the tricycle to turn left or right and to enable the tricycle to lean sideward at the turning direction. While the tricycle runs faster, the turning steering can enable the tricycle to have "tail slide" effect.

4 Claims, 8 Drawing Sheets

TRICYCLE

BACKGROUND OF THE INVENTION

1. Field of the Invention

The present invention relates generally to manpower-driven vehicle, and more particularly, to a tricycle.

2. Description of the Related Art

Referring to FIG. 8, a conventional tricycle 2, especially the one for children, is comprised of a frame 90, a seat cushion 91, a front wheel 92, and two rear wheels 93. The frame 90 further includes a frame body 901, a steering handle 902, and a front fork 903 rotatably mounted to a front end of the frame body 901 and connected with the steering handle 903. The front wheel 92 is rotatably mounted to the front fork 903. Two cranks 94 are fixedly mounted on the front wheel 92, each having a pedal 941 rotatably connected therewith. The two rear wheels 93 are rotatably mounted respectively to bilateral sides of a rear end of the frame body 901. A child can sit on the seat cushion 91 and let the hands hold the steering handle 902 and the feet step on the two pedals 941 to drive the tricycle 2 carrying the child to move forward.

In addition to forward and turning movement, the conventional tricycle 2 is devoid of educative and challenging steering to become less and less popular with the children.

SUMMARY OF THE INVENTION

The primary objective of the present invention is to provide a tricycle, which maneuverability is diversified to have more fun.

The foregoing objective of the present invention is attained by the tricycle, which is comprised of a frame, a seat cushion, a front wheel, a parallel four-bar linkage, two rear wheels, and two handlebars. The frame includes a stationary fork, which is not turnable and is rotatably connected with the front wheel. The linkage is mounted at a rear section of the frame, having two side bars. The two rear wheels are rotatably mounted respectively to the two side bars. The two handlebars are fixed to the linkage and located at bilateral sides of the seat cushion. The user can let the hands control the two handlebars to drive the tricycle to turn left or right and to enable the tricycle to lean sideward at the turning direction. While the tricycle runs faster, the turning steering can enable the tricycle to have "tail slide" effect. Accordingly, the tricycle is diversified in steering to have more fin.

DETAILED DESCRIPTION OF PREFERRED EMBODIMENTS

Figure 1:
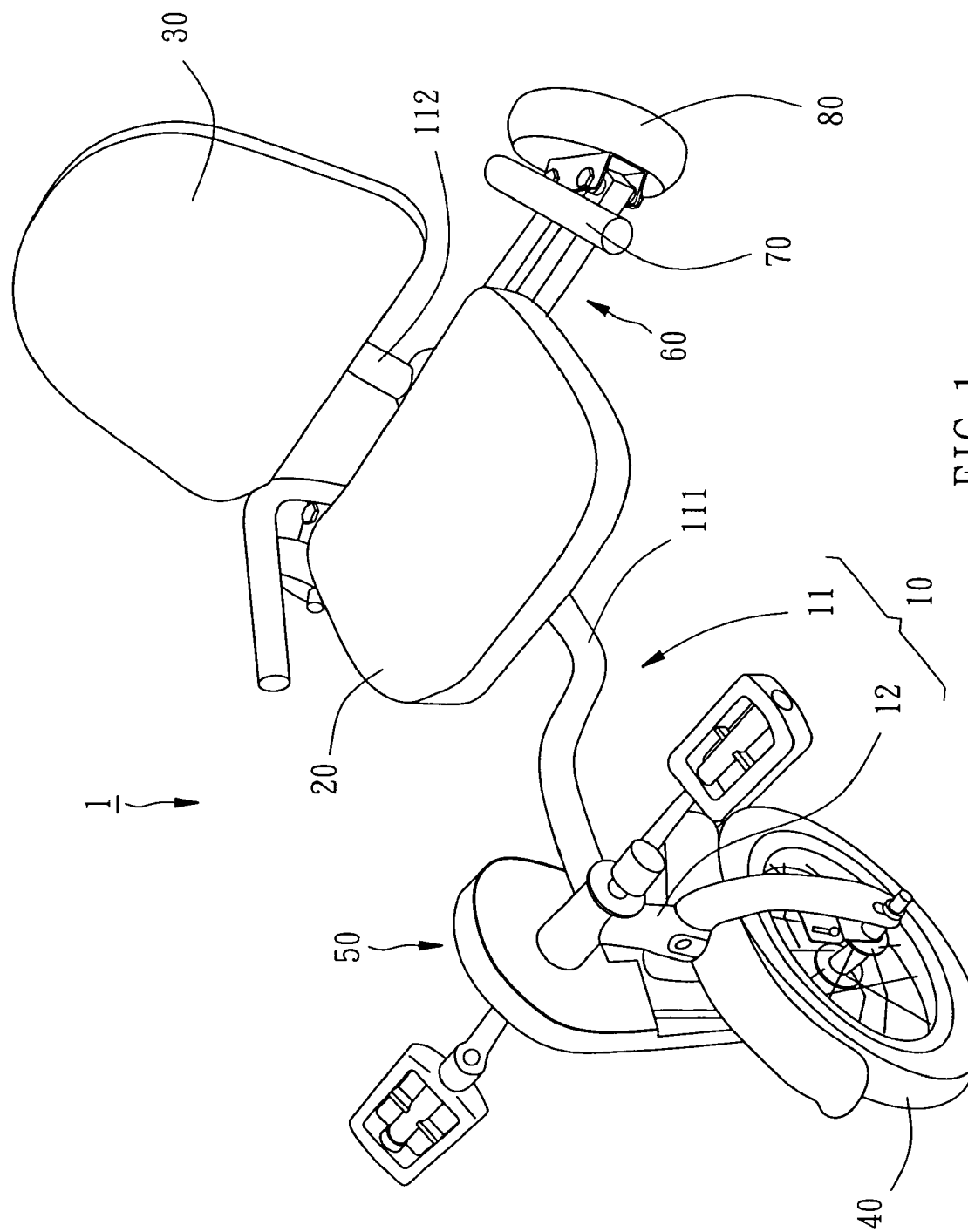
FIG. 1 is a perspective view of a preferred embodiment of the present invention.

Referring to FIGS. 1–5, a tricycle 1 constructed according to a preferred embodiment of the present invention is comprised of a frame 10, a seat cushion 20, a back cushion 30, a front wheel 40, a transmission mechanism 50, a parallel four-bar linkage 60, two handlebars 70, and two rear wheels 80.

The frame 10 includes a frame body 11 and a front fork 12. The frame body 11 has a first strut 111 and a second strut 112, which leans backward to be welded to the first strut 111 near its rear end. The front fork 12 is fixedly mounted to a front end of the first strut 111.

The seat and back cushions 20 and 30 are fixedly mounted respectively on the first and second struts 111 and 112 for sitting and leaning by one user, who is usually a child.

The front wheel 40 is rotatably mounted to the front fork 12.

Figure 2:
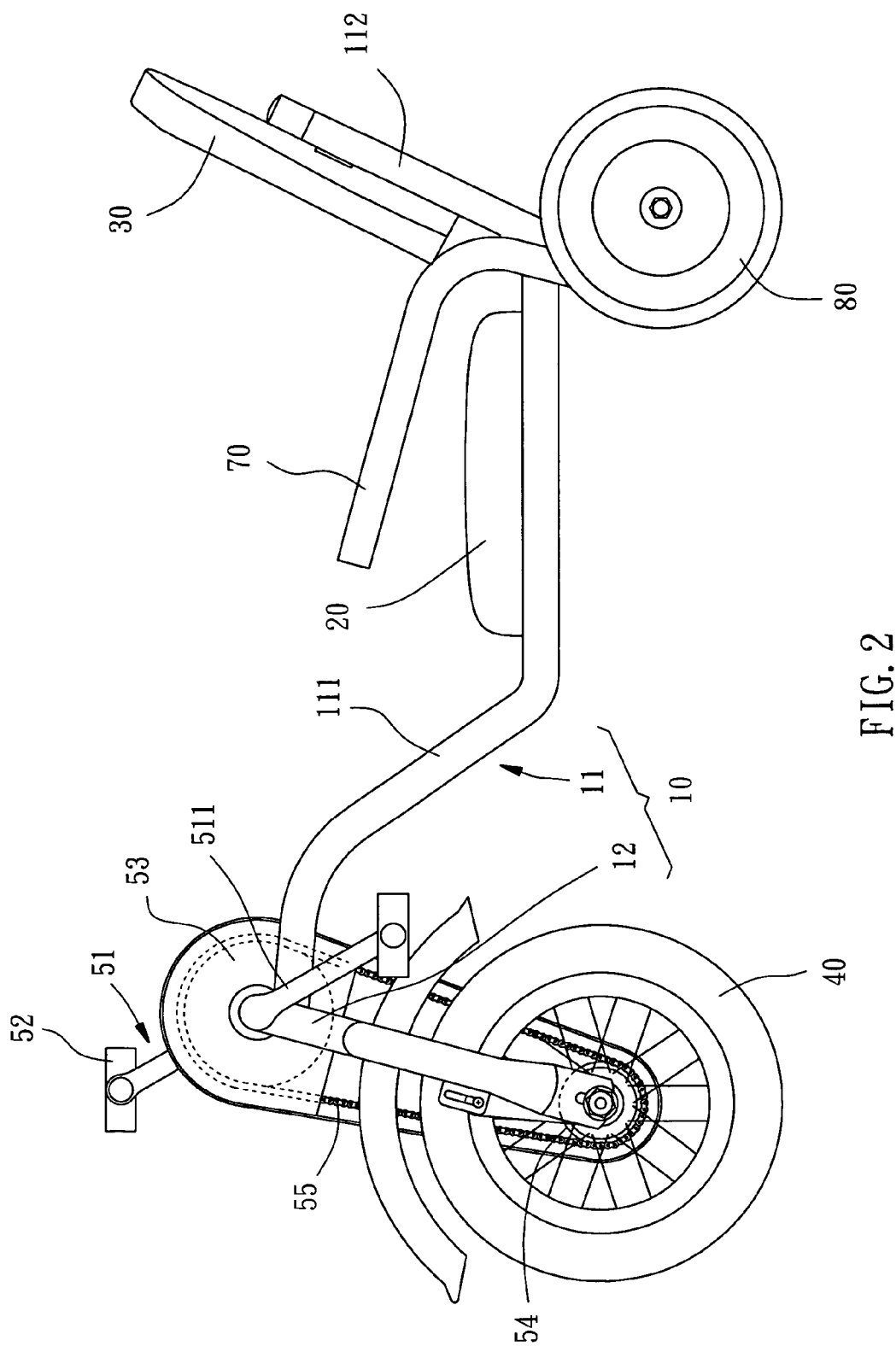
FIG. 2 is a side view of the preferred embodiment of the present invention.

Referring to FIG. 2, the transmission mechanism 50 includes a crank set 51, two pedals 52, a first chain gear 53, a second chain gear 54, and a chain 55. The crank set 51 is rotatably mounted to the front end of the first strut 111, having two cranks 511 respectively located at bilateral sides of the first strut 111. The first chain gear 53 is fixedly mounted on the crank set 51. The second chain gear 54 is mounted on the front wheel 40 for one-way rotation. The chain 55 runs on the first and second chain gears 53 and 54.

Figure 3:
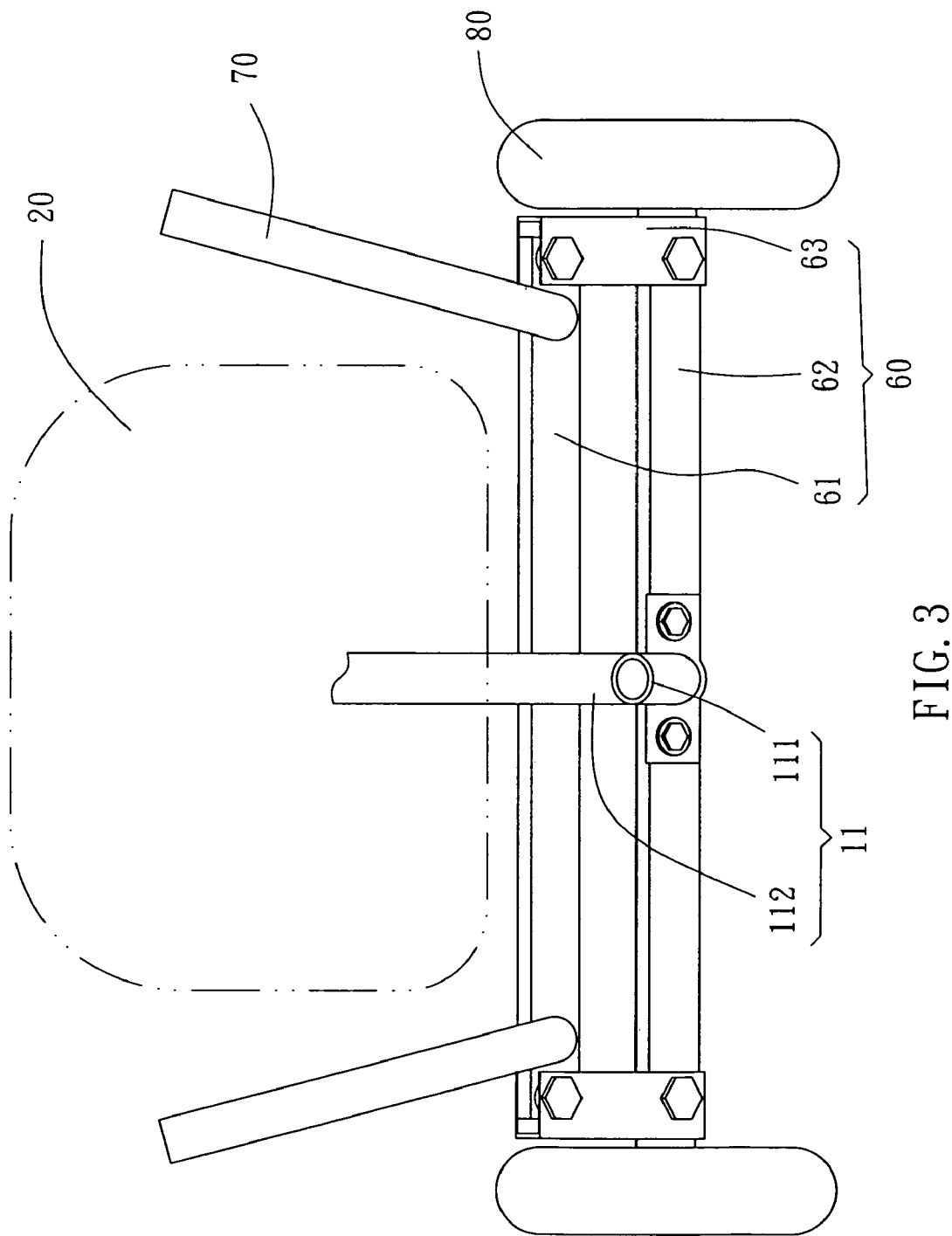
FIG. 3 is a partial top view of the preferred embodiment of the present invention.
Figure 4:
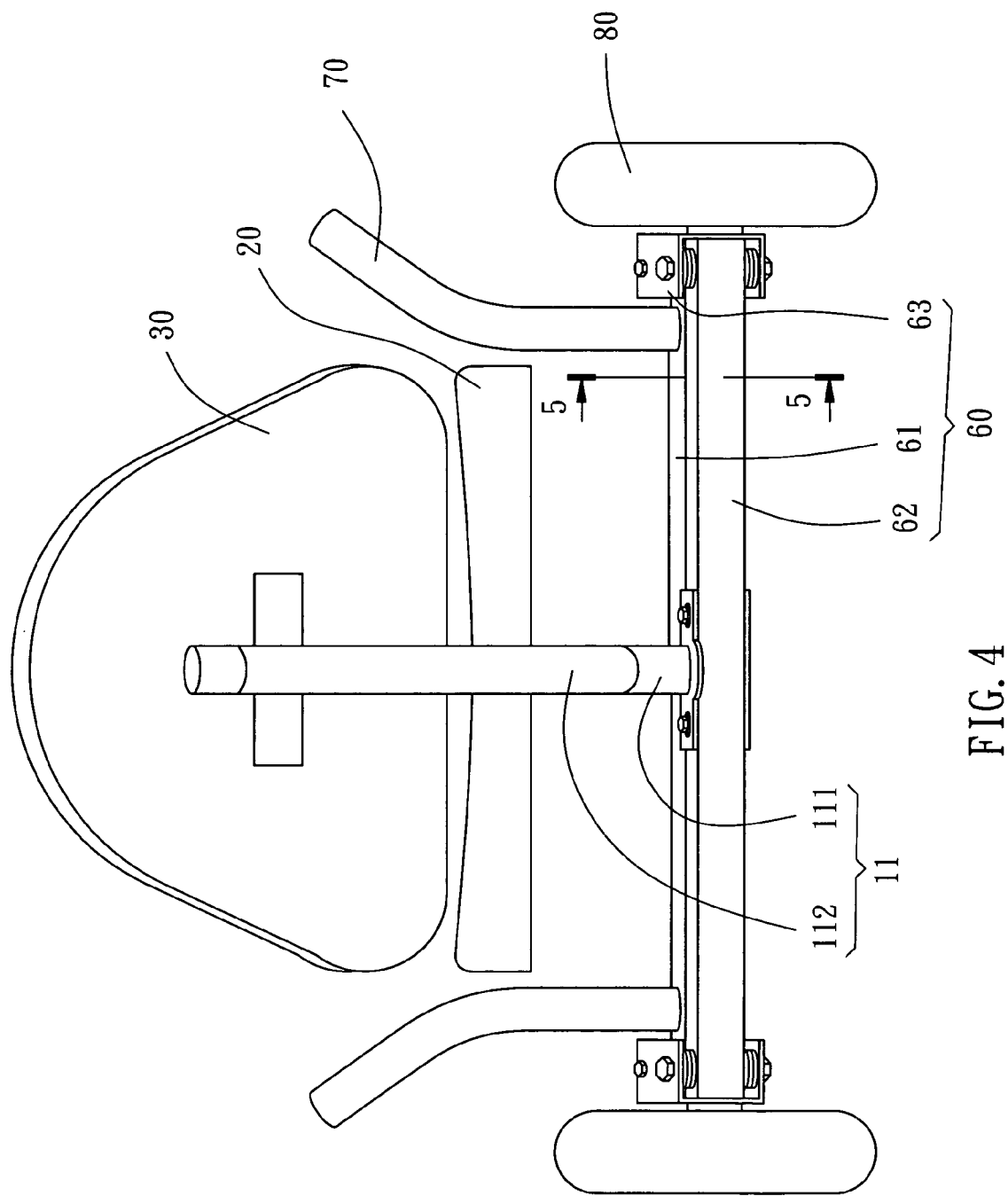
FIG. 4 is a rear view of the preferred embodiment of the present invention.
Figure 5:
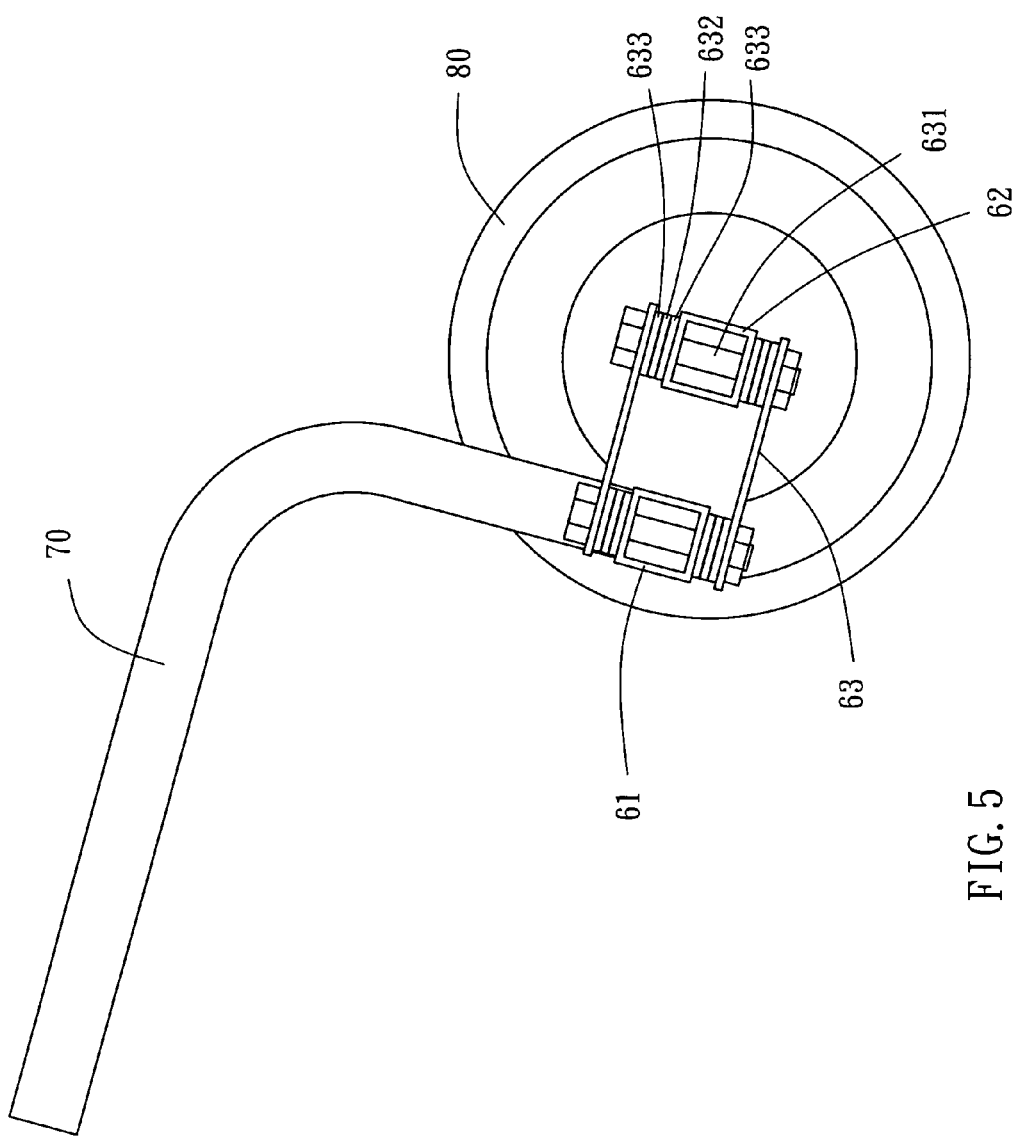
FIG. 5 is a sectional view taken from a line 5—5 indicated in FIG. 4.

Referring to FIGS. 3–5, the parallel four-bar linkage 60 includes a front bar 61, a rear bar 62, and two side bars 63, each of which has two ends pivotally connected respectively with ends of the front and rear bars 61 and 62 at the same side. The front and rear bars 61 and 62 are parallel to each other, and the two side bars 63 are parallel to each other too. The rear bar 62 is fixedly mounted to the rear end of the first strut 111 to cause a smaller distance between the front bar 61 and the front wheel 40 than that between the rear bar 62 and the front wheel 40. Further, the elevation of the front bar 61 is larger than that of the rear bar 62. Referring to FIG. 5, the two side bars 63 are pivotally connected with the front and rear bars 61 and 62 by two pivot bolts 631, four thrust bearings 632, and eight washers 633 to structurally strengthen the linkage 60 and secure smooth pivoting movement of the four bars 61–63 while the linkage 60 is under an external force.

The two handlebars 70 are fixedly mounted on the front bar 61, respectively abutting the two side bars 63 and bilateral sides of the seat cushion 20.

The two rear wheels 80 are rotatably mounted respectively on the two side bars 63, defining an imaginary line running through axes of the two rear wheels 80, wherein the imaginary line overlaps an imaginary long axis of the rear bar 62 while the two rear wheels 80 are parallel to the front wheel 40.

During operation of the tricycle 1, the user sits on the seat cushion 20 by the hip, leans against the back cushion 30 by the back, holds the two handlebars 70 by the hands, and then steps on the two pedals 52 by the feet to pedal the two pedals 52. In the meantime, the crank set 51 drives the first chain gear 53 to run together with the second chain gear 54 through the chain 55, and then the second chain gear 54 drives the front wheel 40 to rotate to enable the tricycle 1 carrying the user to move forward. In addition, since the second chain gear 54 runs in one way, the user can apply counterforce on the two pedals 52 to stop the tricycle 1 from moving forward.

Figure 6:
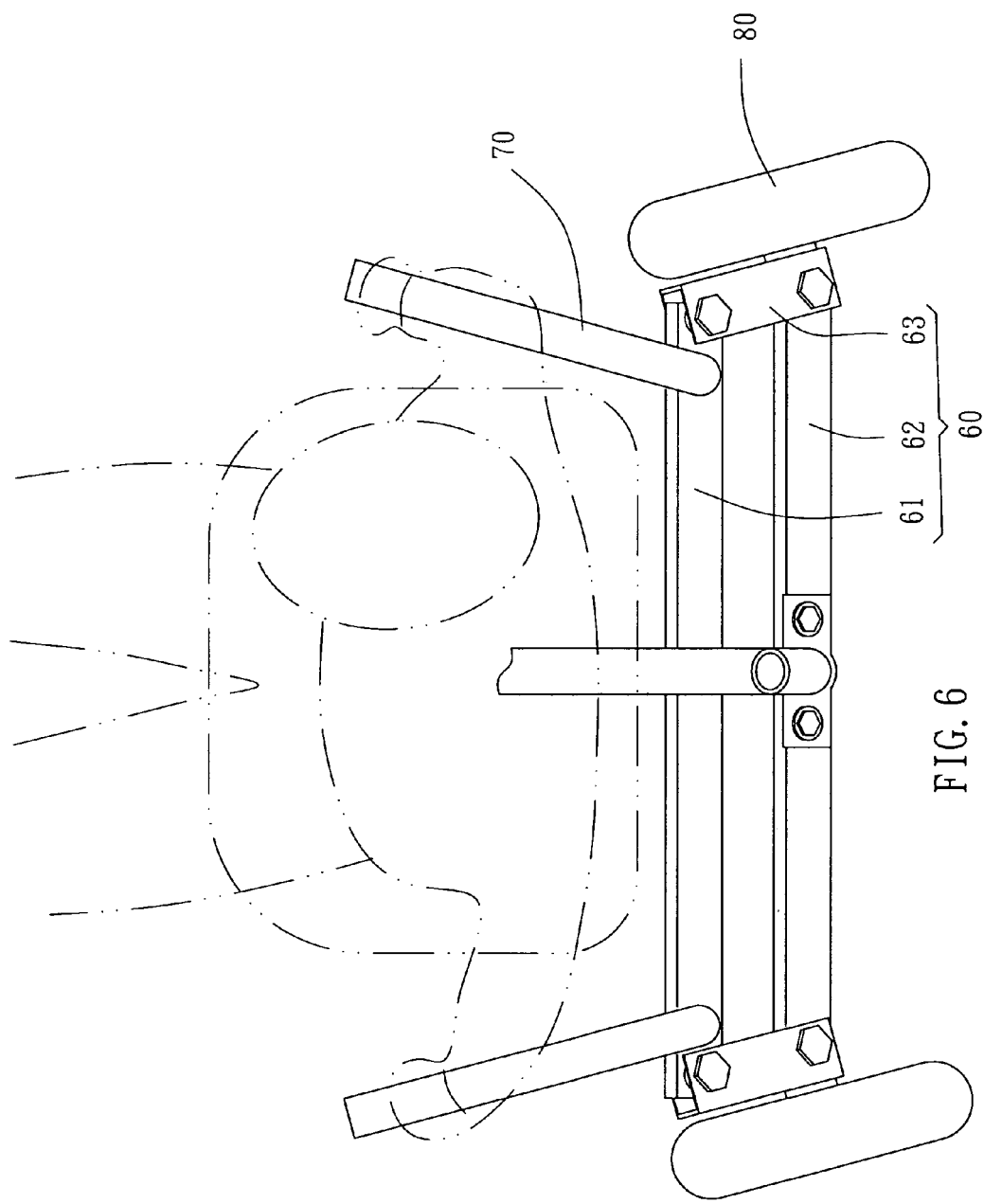
FIG. 6 is a top view of the preferred embodiment of the present invention, which rear wheels are turned left.
Figure 7:
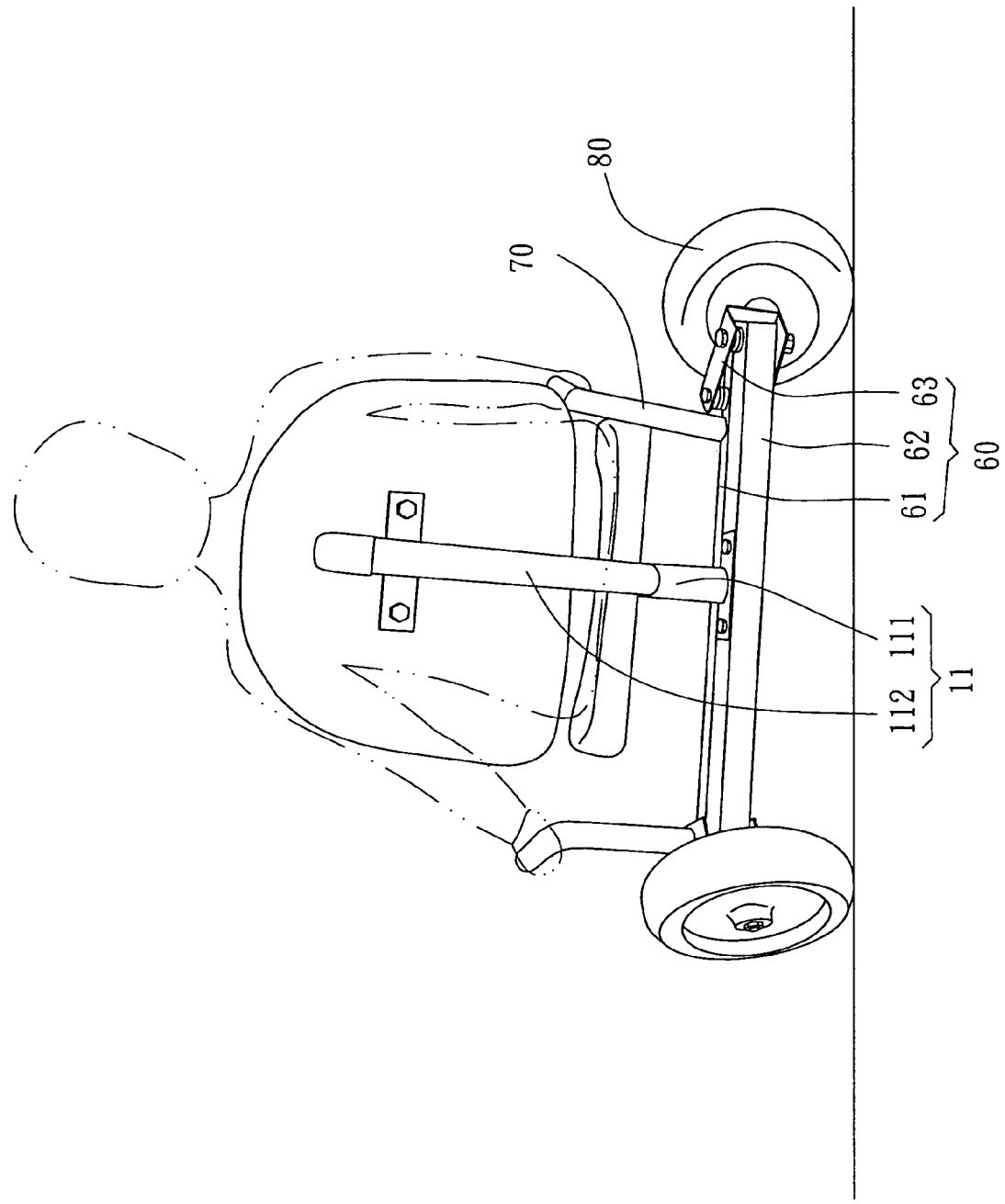
FIG. 7 is a rear view of the preferred embodiment of the present invention which rear wheels are turned left.
Figure 8:
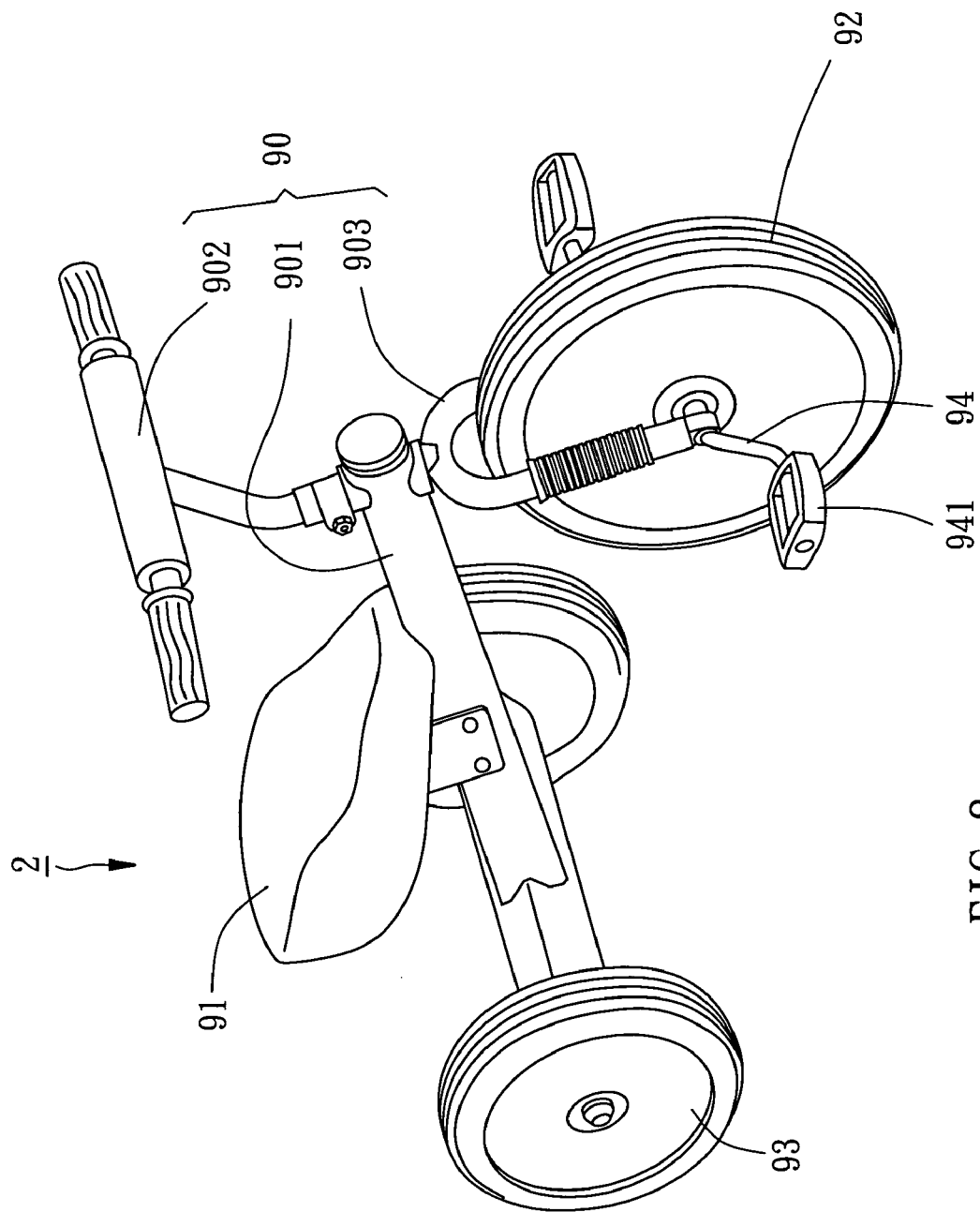
FIG. 8 is a perspective view of a conventional tricycle.

Referring to FIGS. 6–7, while the user intends to turn the tricycle 1 leftward/rightward, the user can pull the two handlebars 70 rightward/leftward by strength to drive right/left horizontal movement of the front bar 61 and together drive the two side bars 62 and the two rear wheels 80 to turn right/left with respect to the rear bar 62, thereby enabling the tricycle 1 to turn left/right. While the user applies strength to the handlebars 70, the user's body naturally leans leftward or rightward. While turning left/right, the two rear wheels 80 are arranged one after the other to enable the tricycle 1 to lean leftward/rightward.

While the user steers the tricycle 1 at higher speed to turn left or right at faster speed, the tail of the tricycle 1 can slide sideward rapidly to attain "tail slide" effect to have more fun for driving the tricycle 1. Since the tricycle 1 is provided with low center of gravity and the user's center of gravity can be moved towards the turning direction and the tricycle 1 can naturally lean towards the turning direction, the tricycle 1 never tends to turn turtle while the "tail slide" effect is under way.

In conclusion, the tricycle 1 of the present invention is provided with diversified steering possibilities to have more fun to further appeal the children's attention and favor.

What is claimed is:

1. A tricycle comprising:
   a frame having a frame body and a front fork fixed to a front section of said frame body;
   a seat cushion fixedly mounted on said frame body;
   a front wheel rotatably mounted to said front fork;
   a transmission mechanism including a crank set having two cranks and rotatably mounted to said frame, two pedals rotatably mounted respectively on said two cranks, a first chain gear fixedly mounted on said crank set, a second chain gear mounted on said front wheel, and a chain running on said first and second chain gears;
   a parallel four-bar linkage having a front bar, a rear bar, and two side bars each pivotally connected respectively with said front and rear bars, said front and rear bars being parallel to each other, said side bars being parallel to each other, said rear bar being fixedly mounted at a rear section of said frame body, a distance between said front bar and said front wheel being smaller than that between said rear bar and said front wheel, an elevation of said front bar being larger than that of said rear bar;
   two handlebars fixedly mounted respectively on said linkage and located respectively beside bilateral sides of said seat cushion; and
   two rear wheels rotatably mounted on said two side bars;
   wherein said frame body comprises a first strut and a second strut, said second strut being welded with said first strut and leaning backward and abutting a rear end of said first strut; said front fork being fixedly welded to a front end of said first strut; said seat cushion being fixedly mounted on said first strut; said crank set being rotatably mounted at the front end of said first strut; said rear bar being fixedly mounted at the rear end of said first strut; and a back cushion being mounted on said second strut.

2. The tricycle as defined in claim 1, wherein said second chain gear runs in one way.

3. The tricycle as defined in claim 1, wherein said two handlebars are fixedly mounted respectively on said front bar to abut said two side bars and bilateral sides of said seat cushion.

4. The tricycle as defined in claim 1, wherein said two rear wheels are rotatably mounted respectively on said two side bars, defining an imaginary line running through axes of said two rear wheels, said imaginary line overlapping an imaginary long axis of said rear bar.

* * * * *